United States Patent
Busch et al.

(10) Patent No.: US 9,400,209 B2
(45) Date of Patent: Jul. 26, 2016

(54) DEVICE FOR MEASURING THE RELATIVE ALIGNMENT OF TWO ARTICLES, AND VIBRATION MEASUREMENT DEVICE

(71) Applicants: Dieter Busch, Ismaning (DE); Heinrich Lysen, Garching (DE)

(72) Inventors: Dieter Busch, Ismaning (DE); Heinrich Lysen, Garching (DE)

(73) Assignee: Prüftechnik Dieter Busch AG, Ismaning (DE)

( * ) Notice: Subject to any disclaimer, the term of this patent is extended or adjusted under 35 U.S.C. 154(b) by 565 days.

(21) Appl. No.: 13/836,891

(22) Filed: Mar. 15, 2013

(65) Prior Publication Data
US 2014/0069196 A1 Mar. 13, 2014

Related U.S. Application Data

(62) Division of application No. 12/940,245, filed on Nov. 5, 2010, now Pat. No. 8,607,635.

(60) Provisional application No. 61/258,275, filed on Nov. 5, 2009.

(51) Int. Cl.
| | | |
|---|---|---|
| *G01H 9/00* | (2006.01) | |
| *G01B 11/27* | (2006.01) | |
| *G01H 17/00* | (2006.01) | |

(52) U.S. Cl.
CPC ............... *G01H 9/00* (2013.01); *G01B 11/272* (2013.01); *G01H 17/00* (2013.01)

(58) Field of Classification Search
None
See application file for complete search history.

(56) References Cited

U.S. PATENT DOCUMENTS

| | | | |
|---|---|---|---|
| 4,698,491 A | 10/1987 | Lysen | |
| 4,984,173 A | 1/1991 | Imam et al. | |
| 6,356,348 B1 | 3/2002 | Lysen et al. | |
| 6,725,723 B2 | 4/2004 | Aronsson et al. | |
| 7,100,289 B1 | 9/2006 | Strege et al. | |
| 7,301,616 B2 | 11/2007 | Foley | |
| 7,711,519 B2 | 5/2010 | Lindberg et al. | |
| 2005/0243315 A1* | 11/2005 | Foley ................... | G01B 11/272 356/400 |

FOREIGN PATENT DOCUMENTS

| | | |
|---|---|---|
| DE | 100 51 870 A1 | 7/2001 |
| DE | 20 2007 015 532 U1 | 4/2009 |
| DE | 10 2009 053 132 A1 | 5/2012 |

(Continued)

OTHER PUBLICATIONS

ADXL326 Datasheet. Analog Devices. Aug. 6, 2009.*

*Primary Examiner* — Hezron E Williams
*Assistant Examiner* — Mark A Shabman
(74) *Attorney, Agent, or Firm* — David S. Safran

(57) ABSTRACT

An alignment device with one or two optoelectronic transmitting and/or receiving units and an evaluation unit. At least one optoelectronic transmitting and/or receiving unit contains an inclinometer. Furthermore, the transmitting and/or receiving unit is connected to a vibration sensor which can be the inclinometer. Both the result of the alignment process and also the result of the vibration measurement are communicated to the user as an easily understandable characteristic on a display of the evaluation unit. For vibration measurement at a non-rotating part of a machine, an accelerometer/inclinometer sensor may be used for measuring acceleration forces resulting from machine vibrations to be measured and for measuring gravity and an electronic evaluation unit determining the orientation of the sensor with regard to gravity from a stationary component of the sensor output and determining sensor orientation from evaluation of non-stationary components of sensor output.

11 Claims, 5 Drawing Sheets

(56) References Cited

FOREIGN PATENT DOCUMENTS

| | | |
|---|---|---|
| EP | 0 999 433 A2 | 5/2000 |
| EP | 2 320 203 A1 | 5/2011 |
| EP | 2 320 204 A2 | 5/2011 |
| EP | 2 320 204 A3 | 6/2011 |
| EP | 2 320 203 B1 | 12/2012 |
| WO | 2006/111152 A1 | 10/2006 |
| WO | 2009/033472 A2 | 3/2009 |

* cited by examiner

|  | Excellent | | Acceptable | |
|---|---|---|---|---|
| Speed | Parallel Offset | Angular | Parallel Offset | Angular |
| (RPM) | (mils) | (mils/inch) | (mils) | (mils/inch) |
| <500 | 5,00 | 1,50 | 6,00 | 2,00 |
| 500-1250 | 4,00 | 1,00 | 5,00 | 1,50 |
| 1250-2000 | 3,00 | 0,50 | 4,00 | 1,00 |
| 2000-3500 | 2,00 | 0,30 | 3,00 | 0,50 |
| 3500-7000 | 1,00 | 0,25 | 2,00 | 0,30 |
| >7000 | 0,50 | 0,20 | 1,00 | 0,25 |

Fig. 4

DEVICE FOR MEASURING THE RELATIVE ALIGNMENT OF TWO ARTICLES, AND VIBRATION MEASUREMENT DEVICE

CROSS REFERENCE TO RELATED APPLICATION

This application is a division of commonly owned, U.S. patent application Ser. No. 12/940,245, filed Nov. 5, 2010, and now U.S. Pat. No. 8,607,635; claims the benefit of, and incorporates by reference, U.S. Provisional Patent Application No. 61/258,275, filed on Nov. 5, 2009.

BACKGROUND OF THE INVENTION

1. Field of the Invention

The invention relates to a device with which both measurement of the alignment state and also measurement of vibration of a rotating machine are possible, and a method for determining a quality characteristic. The invention also relates to a device and a method for measurement of vibrations at a non-rotating part of a rotating machine.

2. Description of Related Art

Devices are known with which alignment, for example, of two shafts relative to one another can be measured. In machinery, motors, for example, drive pumps, the relative alignment of the motor with respect to generally heavier pumps has a major effect on the service life of the entire machine and its components. These devices contain an electronic evaluation device, a first optoelectronic transmitting and/or receiving unit and a second optoelectronic transmitting and/or receiving unit or a reflector instead of the second transmitting and/or receiving unit. These devices are described, for example, in U.S. Pat. No. 4,698,491 and U.S. Pat. No. 6,356,348 B1.

Moreover, devices are known with which vibration measurements are taken and to which an optoelectronic transmitting and/or receiving unit (hereinafter also called an alignment sensor) of an alignment device, as is described in the aforementioned patents, can be connected. In this case, in the past, the vibration sensor and the sensor of the alignment device had always been connected separately to the electronic evaluation device. These combined devices for alignment and for vibration measurement are available, for example, from the assignee of the present application under the trademark smartSCANNER®. Both alignment sensors, like the first optoelectronic transmitting and/or receiving unit and a second optoelectronic transmitting and/or receiving unit (which can also be omitted when using a reflector) as well as vibration sensors, can be connected to the electronic evaluation unit of the smartSCANNER. An inclinometer is contained in at least one of the two optoelectronic transmitting and/or receiving units.

These devices are suitable for taking both alignment measurements and also vibration measurements, but entail problems in reliable handling and in evaluation. When the machine is shut down, alignment measurements are taken. Afterwards, misalignment which may be present is corrected. These activities are often undertaken in a production shutdown, therefore, on the weekend or at night. After restarting the machine, it is a good idea to take a vibration measurement in operation.

As a result of more difficult working conditions at unusual times, it can happen that the optoelectronic transmitting and/or receiving units are forgotten on the shafts of the machine during dismounting and are damaged when the machine is started. Moreover, fatigued personnel often have difficulties in distinguishing or correctly assigning the directions for measurements of vibrations of the axial direction and vibrations of the radial direction in vibration measurement. This also applies especially when the personnel are not adequately trained or are fatigued. Furthermore, it is difficult to bring the corrected alignment which has been determined using the measurement device into agreement with the vibration picture. Also, data which enable this assignment, such as tolerance data or reference spectra of vibration pictures, are often contained in extensive databases which are stored on remote computers and whose contents are not available at all to personnel at the facility at the time or cannot be easily found.

Another problem is the different electronic components which are required for vibration measurement devices and alignment sensors for the evaluation of the signals of vibration sensors, optical position detectors and inclinometers before the signals can be further processed in the central processor of the electronic output unit.

SUMMARY OF THE INVENTION

A primary object of the present invention is overcome the shortcomings associated with the prior art as described above.

This object is achieved by this invention, on the one hand, by simplification of the handling of the measurement device and its parts by one of the two optoelectronic transmitting and/or receiving units which are necessary for alignment also being used to take the vibration measurement; and on the other hand, by simplification of the measurement process in that the measurement device displays a characteristic for the combination of the alignment quality and the vibration picture and it is further communicated to the user on the display of the measurement device how many of the data necessary for determining of the characteristics have been recorded. This characteristic is displayed to the personnel in an easily accessible and understandable form. Thus, prompt and simple joint evaluation of the result of the alignment process and of the vibration picture becomes possible.

It is another object of the invention to provide for a machine vibration measurement device which can be handled in a particularly simple manner, while being of relatively low complexity. It is also an object to provide for a corresponding vibration measurement method.

According to one embodiment, data determined from the sensor output is used to determine a characteristic for the quality of alignment of the machine. Simplification of handling may be achieved by the vibration sensor (i.e., the accelerometer/inclinometer sensor) being connected not to the electronic evaluation unit, as in the past, but directly to the alignment sensor, or by it preferably being installed in the alignment sensor. This results in that the operators are forced to handle the alignment sensor in the preparation of the vibration measurements after completed alignment. Thus, the alignment sensor cannot be forgotten on the machine. This embodiment of the invention may be further improved by the second measure of display of the degree of detection of a common characteristic for the alignment in accordance with the invention and for the vibration picture and display of this characteristic.

In the combination of the vibration sensor and alignment sensor, a further increase of reliability and simplification in operation is achieved in that the accelerometer/inclinometer sensor contained in at least one of the two optoelectronic transmitting and/or receiving units also enables checking of the alignment of the accelerometer/inclinometer sensor in the vibration measurement, especially whether alignment of the accelerometer/inclinometer sensor is in the axial direction relative to the aligned shafts or in the radial direction to them. In this way, the reliability of the determined vibration data is greatly increased.

In the implementation of this approach, it was surprisingly found that, with a suitable selection of the vibration sensors and of the inclinometer, the electronics for preprocessing of the signals of these two sensors can be combined before they are relayed from the alignment sensor to the electronic evaluation unit when the components are suitably chosen. Electronics here include components such as signal amplifiers, filters and A/D converters. This constitutes both a simplification of the structure of the sensors and also cost savings.

It is even possible to implement the two sensors in a single common module, for example when the vibration sensor and the inclinometer are made, e.g., as accelerometer/inclinometer sensors, preferably they are made as microelectromechanical systems (MEMS) modules. Regardless of whether the vibration sensors and inclinometers are one or more modules, it is a good idea for these sensors to be able to detect signals in two or three dimensions. Therefore, preferably two- or three-dimensional inclinometers or two- or three-axis vibration transducers are used.

Another option for simplification of operation and handling of this combined vibration and alignment device is the display of an easily understandable value in the form of a characteristic with which a prompt and reliable conclusion about the instantaneous vibration state and the success of the alignment measure is made available to the operators. This factor also encompasses the fact that the personnel of the alignment and vibration measurement device on the display of the electronic evaluation device are also notified of how many of the data required for determining this characteristic have been recorded with the device.

The common characteristic for alignment and the vibration picture takes into account the values measured after alignment with the alignment sensor and the alignment tolerances as well as the vibration picture after restarting the machine. For detection and numerical description of this vibration picture different vibration characteristics can be used. These vibration characteristics can be the following: the ratio of the vibration intensity measured in the radial direction to the vibration intensity measured in the axial direction, the ratio of the vibration signal measured at the current rotary frequency of the machine to the vibration signal measured at the harmonic of the current rotary frequency, the ratio of the vibration signal in operation of the machine before alignment to the vibration signal recorded under comparable conditions in the operation of the machine after alignment.

The invention is beneficial in that, by providing the device with an accelerometer/inclinometer sensor for measuring acceleration forces resulting from the machine vibrations and for also measuring gravity and by determining the orientation of the sensor with regard to gravity from the stationary component of the sensor output and evaluating the non-stationary components of sensor output at according to the determined sensor orientation, the measurement procedure is simplified, since the device, due to the integrated inclinometer function, is able to determine the orientation of the sensor with regard to gravity in the measurement position and to automatically interpret/evaluate the acceleration measurement data accordingly, without the need for an additional inclinometer to be added to the accelerometer sensor.

According to a feature of the invention, the device comprises a first optoelectronic transmitting and/or receiving unit in a first housing, a second optoelectronic transmitting and/or receiving unit with a housing or a reflector in a second housing, and at least one of the optoelectronic transmitting and/or receiving units being connected to the electronic evaluation unit, and wherein the sensor is connected to one of the optoelectronic transmitting and/or receiving units The invention is described in further detail below with reference to the accompanying drawings.

BRIEF DESCRIPTION OF THE DRAWINGS

FIG. 4 is a table which contains alignment tolerances for offset values determined with the alignment devices of FIGS. 1-3.

DETAILED DESCRIPTION OF THE INVENTION

Figure 1:
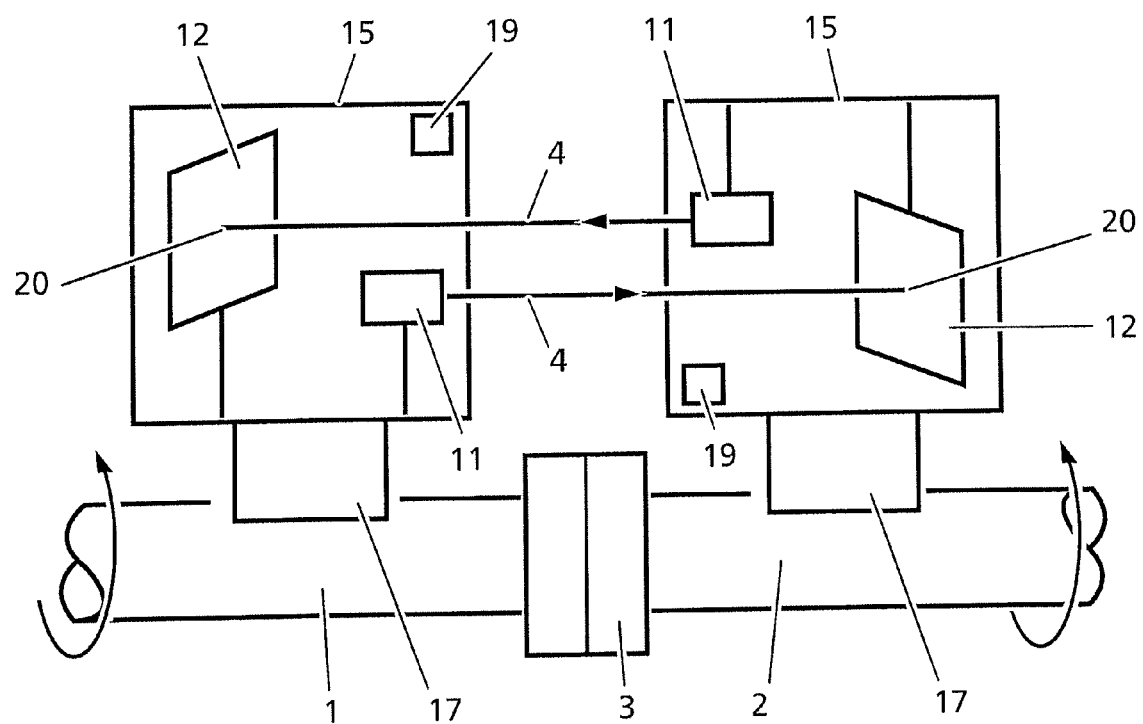
FIG. 1 schematically depicts an alignment device with two optoelectronic transmitting and receiving units.

FIG. 1 shows a conventional alignment device which is attached to two horizontally positioned shafts 1, 2 which are connected to a coupling 3. The two shafts 1, 2 can belong, for example, to a motor and a pump which is driven by this motor and which is a component of a larger machine. Housings 15 are attached by holding devices 17 to the shafts 1, 2 and a light source 11 and a one- or two-dimensionally readable photosensitive sensor 12 are installed in the housings 15. This attachment takes place such that a light source is always opposite a sensor. During alignment measurement, each light source 11 emits a light beam 4 which is received on the detector 12 and whose incidence position 20 is electronically evaluated in order to determine, and if necessary correct, the offset of the two shafts 1, 2. Conventionally, at least one of these housings 15 contains an inclinometer 19. In accordance with the invention, this inclinometer is also used for vibration measurements. Instead of an inclinometer, an accelerometer/inclinometer sensor 19 can be used for both vibration measurements and for inclinometer measurements.

Figure 2:
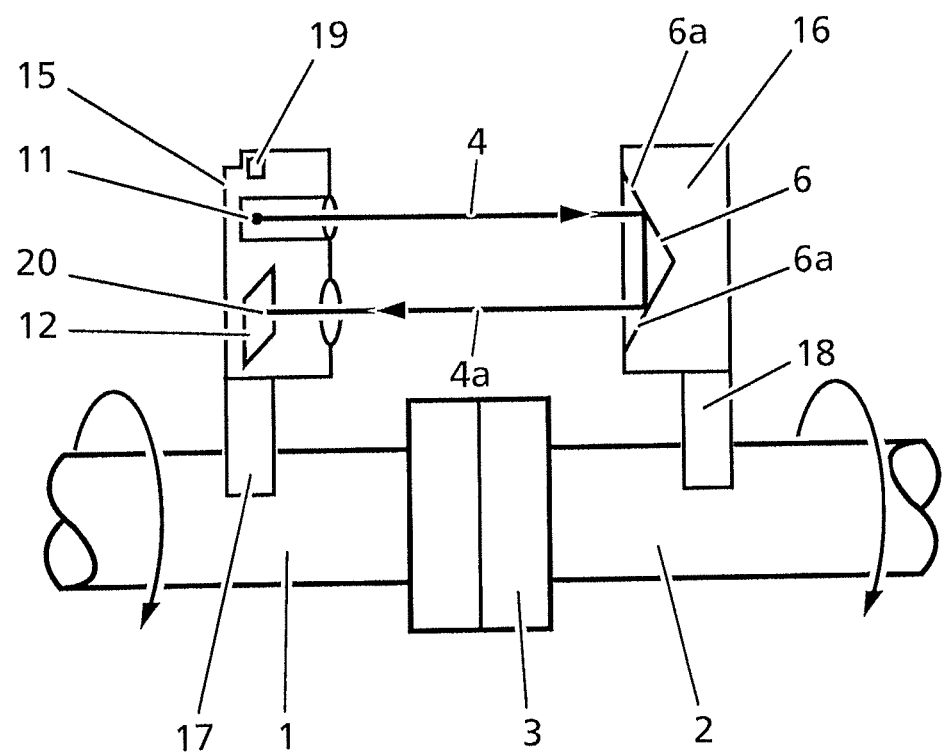
FIG. 2 schematically depicts an alignment device with one optoelectronic transmitting and receiving unit and a reflector.

FIG. 2 illustrates a simpler alignment device in which the transmitting and receiving unit on the shaft 1 corresponds essentially to the embodiment of FIG. 1. However, instead of a second transmitting and receiving unit, a reflector 6 is mounted on the shaft 2 and which reflects the light beam 4 that has been emitted from the light source 11 as the light beam 4a onto the detector 12. The reflector 6 is located in its own housing 16 on a holding device 18. In the transmitting and receiving unit, there is a MEMS inclinometer or accelerometer/inclinometer sensor 19 which is also used for vibration measurement or for both vibration and inclinometer measurements, respectively. Here, the fact is used that an inclinometer which is actually used to display the direction relative to the direction of gravitational acceleration and which responds in the frequency range of a few hertz or fractions of a hertz can also be used as an accelerometer for an acceleration measurement perpendicular to the direction of gravitational acceleration. A suitable MEMS accelerometer/inclinometer sensor module is available, for example, as model ADXL326 from the company Analog Devices, Norwood, Mass. 02062-9106, USA. From the stationary component of the sensor output (e.g., up to frequencies of a few Hertz), the sensor orientation with regard to gravity can be determined, i.e., the sensor is used as an inclinometer, and the non-stationary components of the sensor output (e.g., up to 10 kHz) are used for vibration measurements, i.e., the sensor is used as an accelerometer.

For vibration measurements, the upper limits of the response frequencies of 10, 20 or even 40 kHz are conventionally used. Thus, for the choice of a combined inclinometer and accelerometer, a frequency range of almost 0 Hz to 10 kHz or more is feasible. This frequency range is easily attainable with modern MEMS modules. It is simply necessary to consider the directional behavior of the module when the inclinometer is installed or the vibration sensor is placed on the machine. For the inclinometer, this is directly considered during installation, when the vibration sensor is placed on the machine, alignment of the sensor can preferably take place, as is described in EP 0 999 433 A2. The alignment of the sensor is displayed on the display of the computer for the user there.

The MEMS inclinometer 19 is mounted in the vicinity of one corner of the housing 15. So that it is possible to place the housing of the transmitting and receiving unit on a machine to be measured, this corner is provided with one or more guide edges, guide surfaces or guide bezels and is shaped to the inside, as indicated in FIG. 2. Here the guide edges or guide bezels need not necessarily be straight, as in the figure. There can also be angles other than 90° between the guide edges or guide bezels. For example, if there are three guide surfaces, one corner of the housing is turned up so to speak to the inside and acquires the shape of a triple mirror. So that the guide surfaces, edges or bezels enable good coupling to the machine to be measured for vibration measurement which are preferably convexly curved.

Figure 3:
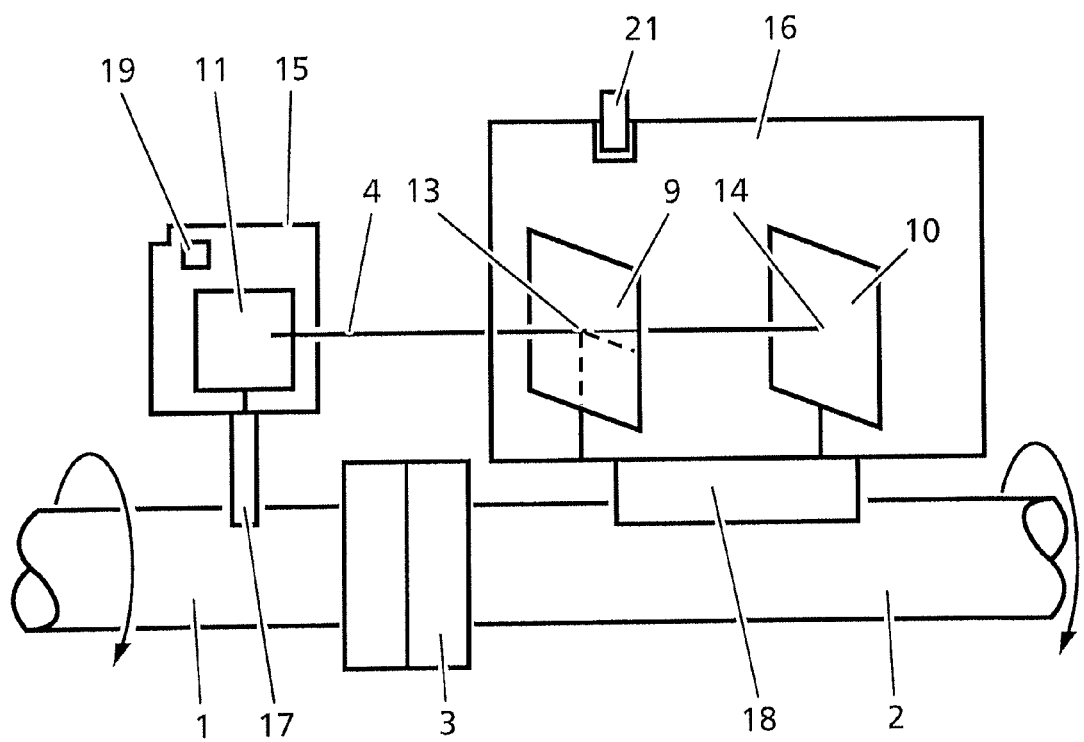
FIG. 3 schematically depicts an alignment device with one optoelectronic transmitting unit and one optoelectronic receiving unit.

FIG. 3 shows another embodiment of the invention. Here, a housing 15 which is attached to the shaft 1 with a holding device 17 contains a light source 11 which emits a light beam 4. This light beam is received in a first detector 9 mounted on the shaft 2 with a holding device 18 in a housing 16, and a second detector 10. These detectors are mounted in succession in the beam path. If the detector 9 which is located nearer the entry opening in the beam path is not transparent enough, the attachment of the two detectors at different distances to the light source 11 can be accomplished, for example, by means of a beam splitter. The housing 15 again contains an inclinometer 19. In one recess of the housing 16, a vibration sensor or accelerometer/inclinometer 21 or a probe tip is inserted in order to take the vibration measurement.

Conventionally, the optoelectronic receiving unit in the housing 16 is attached with two rods to a clamping device 18 on the shaft to be aligned which has a prism-shaped depression for adaptation to the shaft. The two rods extend parallel to one another from this clamping device and parallel to a line which runs radially relative to the shaft. Accordingly, the housing 16 has two openings which penetrate the housing to hold the rods. The housing 16 and the optoelectronic receiving device contained in it are then fixed at a certain distance relative to the shaft, for example, by way of clamping screws. These openings can be feasibly used for inserting a vibration sensor by, for example, their inner sides being provided with electrical contacts. When the corresponding contacts on the vibration sensor 21 to be inserted are pressed outward with springs, reliable electrical contact-making is achieved. As is described below, in one preferred configuration, the vibration sensor is made as a two-axis or three-axis vibration sensor. In another configuration, the vibration sensor is integrated into the housing and permanently installed. A probe tip is inserted into an opening provided for this purpose in the vicinity of this integrated vibration sensor. This probe tip is suitable only for recording vibration signals in one dimension.

All of the alignment devices of FIGS. 1 to 3 also contain an electronic evaluation unit (not shown). The transmitting and/or receiving units are connected by means of cables or wirelessly to this evaluation unit. This electronic evaluation unit is used for communication with the operators. How many of the data to be recorded have already been determined is communicated to the user on the display of this evaluation unit. Typically, working with this device begins with determination of the alignment when the system is shut down. Afterwards this alignment is corrected. The success of this correction is displayed on the display of the evaluation unit in the form of a comparison between the alignment tolerances and the determined offset values.

When the alignment process has been completed and the offset values are within the alignment tolerances, a characteristic which is a measure of the success of the just completed alignment process, therefore an alignment characteristic, is displayed to the operators on the display of the electronic evaluation device. FIG. 4 shows a table with allowable tolerance values dependent on the shaft rpm. When the values for the offset are smaller after alignment than the tolerance values shown in FIG. 4 with the pertinent heading "Excellent", the alignment characteristic can be, for example, in the region of 100. Maintaining the tolerance values labeled "Acceptable" in FIG. 4 can, for example, cause an alignment characteristic in the vicinity of 50. Values for the offset which are outside of this tolerance lead to an evaluation of the alignment with a characteristic near zero.

Furthermore, at this point it is indicated that only some of the tasks to be performed with the measurement device have been completed. This indication can take place, for example, in the form of a bar and/or a percentage. This indication is designed to signal to the personnel that a vibration measurement must still be taken when the system has been started again. If on the display of the electronic evaluation unit after completion of the alignment process it is indicated that only part of the measurement task has been completed, this is a reason for the operators to remove the optoelectronic transmitting and/or receiving units from the shafts of the machine. In this way, the process becomes safer. Damage to the measurement device can thus be avoided since the alignment sensors cannot be inadvertently forgotten on the shafts. The personnel thereupon prepare the alignment sensor for use as a vibration sensor or for a probe tip to be connected to the alignment sensor when the vibration sensor is not integrated in the alignment sensor.

Afterwards, the machine is started again. When the machine is running, best at nominal rpm and after the completed warm-up phase, a vibration measurement can be taken with the alignment sensor and the vibration sensor. This vibration measurement best takes place once in the radial direction with reference to the two shafts which are aligned relative to one another and a second time in the axial direction with reference to the shafts which are aligned to one another.

Advantageously, this measurement can be taken with a single vibration sensor which is sensitive to vibrations in two or three spatial axes. A vibration characteristic can now be computed from the result of this vibration measurement or several measurements. This vibration characteristic can contain the ratio of the axial vibration to the radial vibration. Prior to beginning the alignment process, with the machine still running, if a vibration measurement has already been taken, this vibration measurement can likewise be used for formation of the vibration characteristic. One example is the ratio of the vibration intensity in operation before alignment to the vibration intensity in operation after alignment. To compute the vibration characteristic, measurements in the radial and axial direction after alignment can also be used and are combined with measurements in the radial and axial direction before alignment in order to obtain a vibration characteristic.

The evaluation unit is used for determining the orientation of the sensor with regard to gravity from the stationary component of the sensor output and for evaluating the non-stationary components of the sensor output, i.e. the vibration signals, according to the determined sensor orientation. In particular, the evaluation unit is adapted to transform the acceleration values measured along the measurement axes into acceleration values along the vertical axis and along two orthogonal horizontal axes.

When these procedures are completed, in the electronic evaluation unit the degree of execution of the tasks to be performed with the measurement device is set such that at this point all activities are considered completed. A graphic representation on the display of the electronic evaluation unit as a bar is complete, a percentage displayed there is now 100.

Moreover, in the memory of the electronic evaluation unit two characteristics are now stored, specifically on the one hand the alignment characteristic and on the other hand the vibration characteristic. These two characteristics can be normalized in a suitable manner. An alignment characteristic of 100 can for example constitute perfect alignment, an alignment characteristic near zero can mean very poor alignment. The vibration characteristic can be similarly normalized so that a vibration characteristic of 100 constitutes a good vibration picture, while a vibration characteristic near zero represents a poor vibration picture. In accordance with the invention, the ratio of the alignment characteristic to the vibration characteristic or the inverse thereof is displayed as a fraction on the display of the electronic evaluation direction. With this display as a fraction, it is also possible by computation to combine these two characteristics into one. Thus, with the aforementioned sample values, a ratio near the number one or 100% would constitute a roughly equally good result for the process of alignment and for the vibration picture. In addition, the numerators and denominators of the fraction indicate how successful the process of alignment was or how good the vibration picture present after alignment is. A display of the two values of the numerator and denominator of the fraction further facilitates handling of the device for the operators.

Figure 5B:
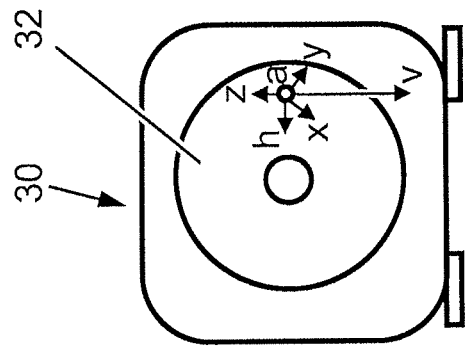
FIGS. 5a and 5b show an example of a vibration measurement device according to the invention which is not used in combination an alignment device in a lateral view and a front view, respectively.
Figure 5A:
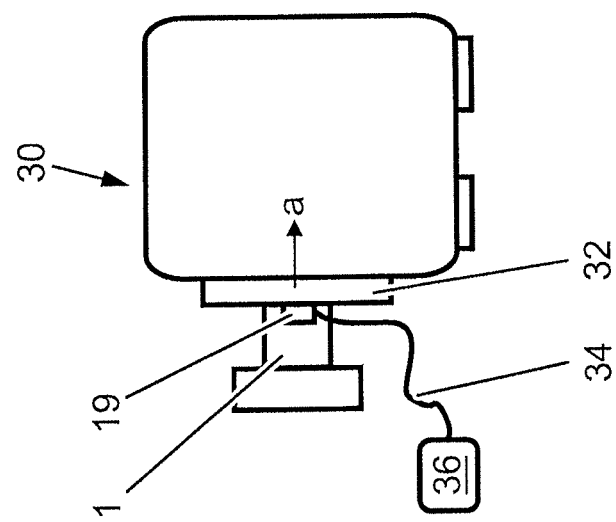

In FIGS. 5a and 5b, an example of a vibration measurement device according to the invention is shown which is not used in combination with an alignment device. In the example of FIG. 5, an accelerometer/inclinometer vibration sensor 19 is positioned at a non-rotating part 32, e.g., a bearing cover, of a machine 30 comprising a rotating part, such as a shaft 1, for conducting vibration measurements during operation of the machine 30. Preferably, the sensor 19 is fixed at the machine part 32 via a magnetic holder. The sensor 19 is connected via a cable 34 to an electronic evaluation unit 36.

The evaluation unit determines the orientation of the sensor 19 with regard to gravity from the stationary component of the sensor output and evaluates the non-stationary components of the sensor output, i.e., the vibration signals, according to the determined sensor orientation. In particular, the evaluation unit transforms the acceleration values measured along the measurement axes x, y, z of the sensor 19 into acceleration values along the vertical axis v, a horizontal axis h and an axial axis a of the machine (the axial axis a is also horizontal but orthogonal to horizontal axis h). The measurement device, as such, cannot distinguish between horizontal directions h and a based on the inclinometer signal; rather, by the positioning the sensor 19 at a surface parallel or perpendicular to the axis a of the rotating part 1, one of the horizontal directions, namely the axial axis a, is defined; the other horizontal direction then is assumed to be the axis h.

Thus, the measurement device automatically recognizing the vertical axis v based on the inclinometer signal provided by the sensor 19, so that the user does not have to care about the positioning of the sensor 19 with regard to vertical. Thereby, at least as far as the vertical axis is concerned, the measurement device is able to automatically recognize different measurement positions at the machine.

What is claimed is:

1. A device for vibration measurement at a non-rotating part of a machine, comprising:
    an accelerometer/inclinometer sensor for measuring acceleration forces resulting from machine vibrations to be measured and for measuring a direction of gravitational forces and
    an electronic evaluation unit connected to receive output of the sensor and adapted to determine the orientation of the sensor with regard to the direction of gravitational forces from a stationary component of the sensor output and to determine sensor vibration from an evaluation of non-stationary components of the sensor output.

2. The device of claim 1, further comprising a first optoelectronic transmitting unit in a first housing, a second housing with a second optoelectronic transmitting unit and a reflector, and an optoelectronic transmitting units being connected to the electronic evaluation unit and the sensor.

3. The device of claim 2, wherein the connection of the sensor to the optoelectronic transmitting is a plug-in connector.

4. The device of claim 2, wherein the sensor is installed in at least one of the housings.

5. The device of claim 2, further comprising a first optoelectronic receiving unit in the first housing, a second optoelectronic receiving unit in the second housing, the receiving units being connected to the electronic evaluation unit and the sensor.

6. The device of claim 2, wherein the connection of the sensor to the optoelectronic receiving unit is a plug-in connector.

7. The device of claim 1, wherein the sensor has three orthogonal measurement axes.

8. The device of claim 7, wherein the electronic evaluation unit is adapted to transform acceleration values measured along the measurement axes into acceleration values along a vertical axis and along two orthogonal horizontal axes.

9. The device of claim 1, wherein the sensor is a MEMS sensor.

10. The device of claim 1, wherein the sensor is coupleable to the machine which is to be measured via a probe tip.

11. The device of claim 1, further comprising a first optoelectronic receiving unit in a first housing, a second housing with a second optoelectronic receiving unit and a reflector, the receiving units being connected to the electronic evaluation unit and the sensor.

* * * * *